Nov. 16, 1965     R. A. MUNSE     3,217,773
SHEET METAL CLIP WITH NUT MEANS AND SPACING EMBOSSURES
Filed Aug. 24, 1964

INVENTOR.
ROBERT A. MUNSE
BY
Fraser + Fraser
ATTORNEYS

United States Patent Office 3,217,773
Patented Nov. 16, 1965

3,217,773
SHEET METAL CLIP WITH NUT MEANS AND SPACING EMBOSSURES
Robert A. Munse, Perrysburg, Ohio, assignor, by mesne assignments, to The Bishop and Babcock Corporation, Toledo, Ohio, a corporation of Ohio
Filed Aug. 24, 1964, Ser. No. 393,004
1 Claim. (Cl. 151—41.75)

This application is a continuation-in-part of application Serial No. 40,805 filed July 5, 1960, and now abandoned.

This invention relates to sheet metal fasteners but more particularly to clips for engaging over the edges of a supporting panel having screw-receiving holes and having parts for snap engagement into the holes thereby to locate the clip properly for reception of the screw.

Heretofore, clips of this character which are generally of C or J form are difficult to apply to the supporting panel because the arms do not readily flex away from each other and since the space between the locator flange and the other arm of the clip is somewhat less than the thickness of the panel, the friction between the clip and panel is considerable and requires great effort to force the clip into position. Not infrequently these clips are of tempered spring metal and are actually so stiff that the arms cannot be pried apart by hand so that a hammer or other tool must be used for the purpose. Another difficulty resides in the fact that the clips are often so small that handling becomes a problem.

An object is to facilitate the application of these clips to the supporting panel by reducing the effort required.

A further object is to produce a J clip provided with nut means on one arm and a locator flange on the other arm and so formed that the space between the locator flange and the other arm of the clip is afforded to the extent that application of the fastener to the supporting panel can be effected without the difficulty heretofore encountered, thereby expediting the work without in any way detracting from the efficiency and usefulness of the fastener.

A still further object is to produce a J clip having a nut on the longer arm and a locator flange on the free edge of the shorter arm with a space reservoir between points on opposite sides of the nut for facilitating the application of the clip to the edge of a supporting panel.

A still further object is to produce a J clip as above described which has reduced contact area between the longer arm of the clip and the panel surface thereby reducing the frictional engagement between the clip and the panel during the application thereof.

A still further object is to produce a J clip as above described for easier application to a wider range of supporting panel thicknesses.

Figure 1:
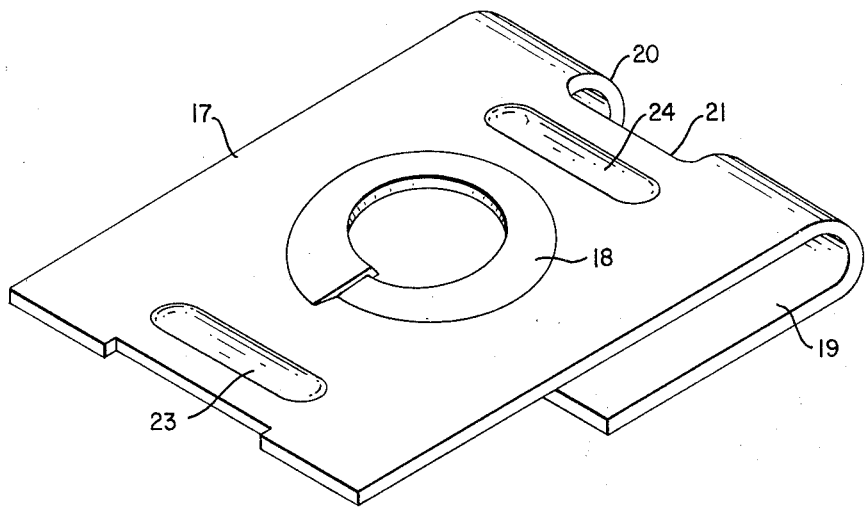
Figure 2:
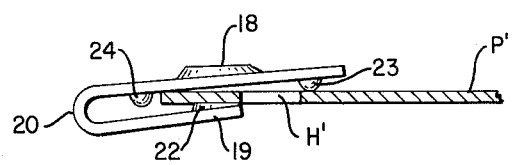
Figure 3:
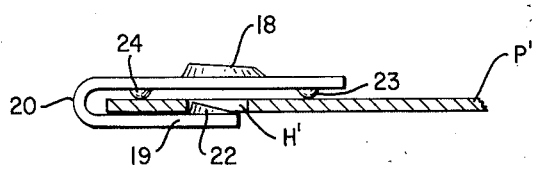

Other objects and advantages of the invention will hereinafter appear, and for purposes of illustration but not of limitation, an embodiment is shown on the accompanying drawings, in which FIGURE 1 is an enlarged top perspective view of an alternative form of a J clip embodying the invention;

FIGURE 2 is an edge view of the clip shown in FIGURE 1 in the process of being applied to an apertured supporting panel; and FIGURE 3 is a view similar to FIGURE 2 but with the clip in fully applied position of use.

The illustrated embodiment comprises a one-piece sheet metal J clip which has a relatively long upper arm 17 formed centrally with an integral nut 18 which will be recognized as the well known nut impression referred to as Prestole. In this instance in spaced parallel relationship is a shorter arm 19 (a little over one-half the length of the arm 17) which is integrally joined to the longer arm 17 by a bend 20 which in order to increase flexibility and decrease weight is a cut-out 21.

On the free end of the shorter arm 19 of the clip is a locator 22 which consists of a flange inclining upwardly and rearwardly from the free edge of the arm. The purpose of the locator is to snap into a panel aperture and retain the clip in position of use, properly located so that a screw can be inserted through the panel aperture into engagement with the nut impression on the upper arm.

The longer arm of the clip has two embossures 23 and 24 which are formed equidistantly on opposite sides of the axis of the nut impression 18. These embossures project downwardly toward the shorter clip arm 19 a sufficient distance to provide between the embossures a reservoir of space enabling application of the clip to the supporting panel P' easier so that the locator 22 can enter the panel aperture H' with considerably less effort by greatly reducing the frictional drag between the clip and the panel.

The embossures 23 and 24 as shown are in the form of transverse parallel ribs occupying about one-third of the transverse dimension of the clip arm 17. Other forms of embossures, such as one or more dimples, may be employed although the location thereof should be substantially as illustrated.

A further advantage of the embossures 23 and 24 is to enhance the strength of the arm 17 and militate against breakage or bending.

Numerous changes in details of construction, arrangement and choice of materials may be effected without departing from the spirit of the invention, especially as defined in the appended claim.

What I claim is:

A clip comprising a substantially J-shaped sheet metal body having a relatively long upper arm and a shorter lower arm arranged generally parallel to each other, a curvilinear bend integrally connecting one of the respective end portions of each of said arms, nut means on said upper arm approximately midway of the length thereof, an integral locator flange on the free end portion of said shorter arm and projecting upwardly toward said longer arm and above the surface of said shorter arm, said locator being arranged directly below a portion of said nut means, and means for establishing a space reservoir between said integral bend and the free end of said upper arm, said means including a pair of downwardly extending embossures on the upper arm of said body in general alignment with said nut, one of said embossures being intermediate said nut means and said curvilinear bend, and the other of said embossures being intermediate said nut means and the free end of the upper arm, whereby in the application of the clip to an edge of a supporting panel the major portion of said upper arm is free from frictional engagement with such panel thereby to reduce the frictional drag during movement over same.

References Cited by the Examiner

UNITED STATES PATENTS

| | | | |
|---|---|---|---|
| 2,140,064 | 12/1938 | Tinnerman | 85—36 |
| 2,233,230 | 2/1941 | Tinnerman | 151—41.75 |
| 2,400,270 | 5/1946 | Tinnerman | 151—41.75 |
| 2,432,492 | 12/1947 | Tinnerman | 151—41.75 |
| 2,937,682 | 5/1960 | Patten | 151—41.75 |

EDWARD C. ALLEN, *Primary Examiner.*